(12) United States Patent
Derham et al.

(10) Patent No.: US 10,548,072 B2
(45) Date of Patent: Jan. 28, 2020

(54) WIRELESS NETWORK SELECTION

(71) Applicant: AVAGO TECHNOLOGIES GENERAL IP (SINGAPORE) PTE. LTD., Singapore (SG)

(72) Inventors: Thomas Derham, La Jolla, CA (US); Florin Baboescu, Solana Beach, CA (US); Vinko Erceg, Cardiff, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 177 days.

(21) Appl. No.: 15/611,543

(22) Filed: Jun. 1, 2017

(65) Prior Publication Data

US 2017/0353919 A1    Dec. 7, 2017

Related U.S. Application Data

(60) Provisional application No. 62/344,935, filed on Jun. 2, 2016.

(51) Int. Cl.
| | |
|---|---|
| *H04W 48/10* | (2009.01) |
| *H04W 48/18* | (2009.01) |
| *H04L 29/08* | (2006.01) |
| *H04L 29/12* | (2006.01) |
| *H04L 29/06* | (2006.01) |
| *H04W 48/16* | (2009.01) |
| *H04W 84/04* | (2009.01) |
| *H04W 84/12* | (2009.01) |

(52) U.S. Cl.
CPC ......... *H04W 48/18* (2013.01); *H04L 61/6081* (2013.01); *H04L 67/2833* (2013.01); *H04L 69/22* (2013.01); *H04W 48/10* (2013.01); *H04W 48/16* (2013.01); *H04L 61/6022* (2013.01); *H04W 84/042* (2013.01); *H04W 84/12* (2013.01)

(58) Field of Classification Search
CPC ..... H04W 48/18; H04W 48/16; H04W 48/10; H04W 84/12; H04W 84/042; H04L 67/2833; H04L 61/6081; H04L 69/22; H04L 61/6022
See application file for complete search history.

(56) References Cited

U.S. PATENT DOCUMENTS

| | | | | |
|---|---|---|---|---|
| 2012/0300759 | A1* | 11/2012 | Patanapongpibul | .. H04W 48/14 370/338 |
| 2013/0242897 | A1* | 9/2013 | Meylan | ................. H04W 28/16 370/329 |
| 2015/0131641 | A1* | 5/2015 | Ong | ...................... H04W 48/20 370/338 |

(Continued)

*Primary Examiner* — Lan-Huong Truong
(74) *Attorney, Agent, or Firm* — Morgan, Lewis & Bockius LLP

(57) ABSTRACT

An access point device includes at least one processor circuit and a network interface circuit. The processor circuit sets one or more fields of a frame to at least one value received from a wireless carrier. The value indicates that the wireless carrier supports at least one of a cellular-Wi-Fi link aggregation protocol or a cellular-wireless local area network (WLAN) link aggregation protocol. The network interface circuit connects to a network and sends the frame to a wireless device to advertise that the access point device is capable of supporting the at least one of the cellular-Wi-Fi link aggregation protocol or the cellular-WLAN link aggregation protocol.

13 Claims, 4 Drawing Sheets

(56) References Cited

U.S. PATENT DOCUMENTS

2016/0094325 A1* 3/2016 Liu .................. H04L 23/02
                                              370/329
2016/0337485 A1* 11/2016 Nuggehalli .......... H04L 47/825

* cited by examiner

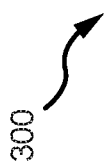

Set, by a processor circuit of a wireless device, at least one field of a frame to at least one value, the value indicating that a wireless carrier supports at least one of a cellular-Wi-Fi link aggregation protocol or a cellular-wireless local area network (WLAN) link aggregation protocol (310)

Connect, by a network interface circuit, to a network and send the frame to a terminal device, the frame indicating that the wireless device is capable of supporting at least one of the cellular-Wi-Fi link or the cellular-WLAN link aggregation protocol (320)

FIG. 3

WIRELESS NETWORK SELECTION

CROSS-REFERENCE TO RELATED APPLICATIONS

This application claims the benefit of priority under 35 U.S.C. § 119 from U.S. Provisional Patent Application 62/344,935 filed Jun. 2, 2016, which is incorporated herein by reference in its entirety.

TECHNICAL FIELD

The present description relates generally to wireless communications, and more particularly, to wireless network selection.

BACKGROUND

Cellular-WLAN coexistence allows a device to support both cellular communication and wireless local area network (WLAN) communications. In some cases, the cellular and WLAN communication may occur simultaneously, e.g. in conjunction with one another. Such coexistence may improve quality of service of a user device, user device coverage, and/or reduce battery power consumption. In third generation partnership project (3GPP) release 13, features known as long-term evolution (LTE) wireless local area network (WLAN) aggregation (LWA) and LTE WLAN radio level integration with IPsec tunnel (LWIP) are specified. The LWA feature allows aggregation of transmissions over licensed and unlicensed spectra between a base station such as an eNodeB (eNB) and a given terminal device (e.g., a user equipment (UE) or a station (STA)) using LTE and WLAN (e.g., 802.11) radio interfaces. The unlicensed spectra includes, for example, the 2.4 GHz industrial, scientific, and medical radio (ISM) band and the 5 GHz unlicensed national information infrastructure (UNIT) band. The aggregation can be performed at the radio layer in a way that can take advantage of radio layer information such as signal quality metrics.

BRIEF DESCRIPTION OF THE DRAWINGS

Certain features of the subject technology are set forth in the appended claims. However, for purpose of explanation, several embodiments of the subject technology are set forth in the following figures.

FIG. 3 illustrates an example of a method of wireless network selection in accordance with one or more implementations.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in block diagram form in order to avoid obscuring the concepts of the subject technology.

In one or more aspects of the subject technology, methods and devices are provided for wireless network selection. The subject technology provides a direct indication of long-term evolution (LTE) wireless local area network (WLAN) aggregation (LWA) and/or LTE WLAN radio level integration with IPsec tunnel (LWIP) support in beacon frames broadcast by WLAN access points (Aps). In some implementations, the subject technology indicates support for LWA and/or LWIP (LWA/LWIP) by sending probe response frames that can be unicast or broadcast by one or more WLAN APs. In some aspects, the subject technology implements a number of network selection mechanisms, as described in details herein.

The disclosed mechanisms are advantageous in a number of ways. For example, the terminal device discovers LWA/LWIP enabled APs are part of its own regular WLAN scanning process, and does not have to perform additional scanning just because it is in coverage of a LWA/LWIP enabled base station (e.g., eNB), even though it may not be in coverage area of a suitable AP. This can substantially reduce power consumption and unlicensed spectrum overhead. The process does not require use of cellular modem until the existence of a suitable LWA/LWIP AP, which is specified by a carrier policy, is already determined. Finally, there is no need for additional signaling by the eNB to indicate support for the LWA/LWIP service.

Figure 1:
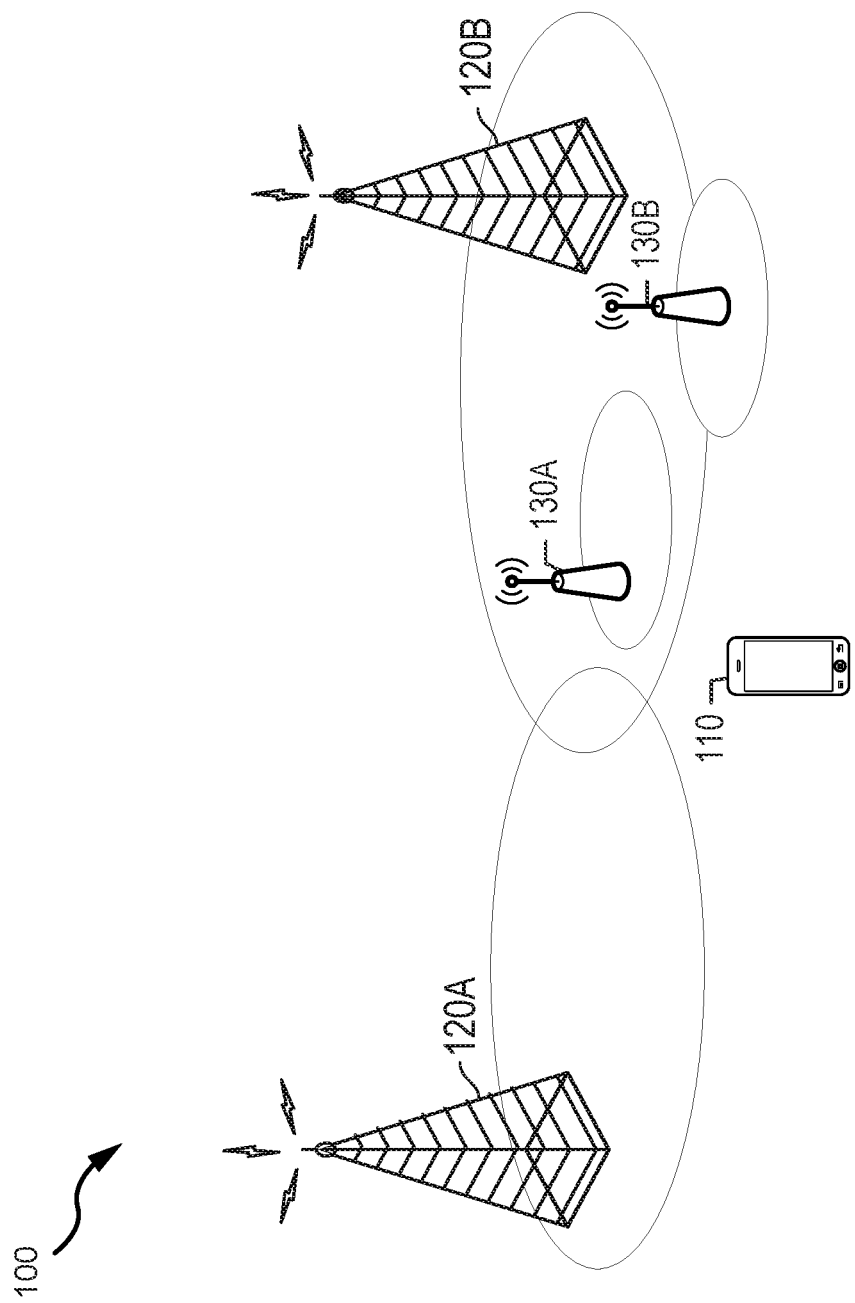
FIG. 1 illustrates an example network environment in which wireless network selection may be implemented in accordance with one or more implementations.

FIG. 1 illustrates an example network environment 100 in which network selection may be implemented in accordance with one or more implementations. Not all of the depicted components may be required, however, and one or more implementations may include additional components not shown in FIG. 1. Variations in the arrangement and type of the components may be made without departing from the spirit or scope of the claims as set forth herein. Additional components, different components, or fewer components may be provided. The example network environment 100 includes a user device 110, base stations 120AB, and access points (APs) 130A-B. The user device 110 may include, may be a component of, and/or may be referred to as, a user equipment (UE), station (STA), or terminal device. The user device 110 includes suitable logic, circuitry, interfaces, memory, and/or code that enables communications, e.g., with one or more of the base stations 120A-B and/or one or more of the access points 130A-B, via wireless interfaces and utilizing one or more radio transceivers. The user device 110 may also be operable to communicate wirelessly with one or more other user devices, one or more other base stations, and/or one or more other access points not shown in FIG. 1. The user device 110 may be, and/or may include, a mobile phone, a personal digital assistant (PDA), a tablet device, a computer, or generally any device that is operable to communicate wirelessly with one or more of the base stations 120A-B and/or one or more of the access points 130A-B. The user device 110 may be, and/or may include one or more components of, the system discussed below with respect to FIG. 2.

One or more of the base stations 120A-B may include, may be a component of, and/or may be referred to as, a cell, a node B (NB), an evolved universal mobile communications system (UMTS) terrestrial radio access network (E-UTRAN) Node B, an evolved NodeB (eNodeB or eNB), a master eNodeB (MeNB), or a home eNB (HeNB). One or more of the base stations 120A-B may be a small (S) cell. One or more of the base stations 120A-B includes suitable logic, circuitry, interfaces, memory, and/or code that enable communications, e.g., with the user device 110 and/or one of the other base stations 120A-B, via wireless interfaces and utilize one or more radio transceivers. One or more of the base stations 120A-B is also operable to communicate wirelessly with one or more other user devices and/or one or more other base stations not shown in FIG. 1.

In one or more implementations, one or more of the base stations 120A-B is a base station of a cellular-based wireless network, such as a long term evolution (LTE) communications network, global system for mobile (GSM) communications network, UMTS communications network, or generally any cellular-based communications network. In some cases, the base stations 120A-B may utilize an unlicensed spectrum in a carrier aggregation procedure, such as in licensed assisted access (LAA) communication.

One or more of the access points 130A-B may include, may be a component of, and/or may be referred to as, a WLAN access point. One or more of the access points 130A-B includes suitable logic, circuitry, interfaces, memory, and/or code that enable communications, e.g., with the user device 110 and/or one of the other WLAN access points 130A-B, via wireless interfaces and utilize one or more radio transceivers. One or more of the WLAN access points 130A-B is also operable to communicate wirelessly with one or more other user devices and/or one or more other access points not shown in FIG. 1. One or more of the WLAN access points 130A-B may be, and/or may include one or more components of, the system discussed below with respect to FIG. 2.

Figure 2:
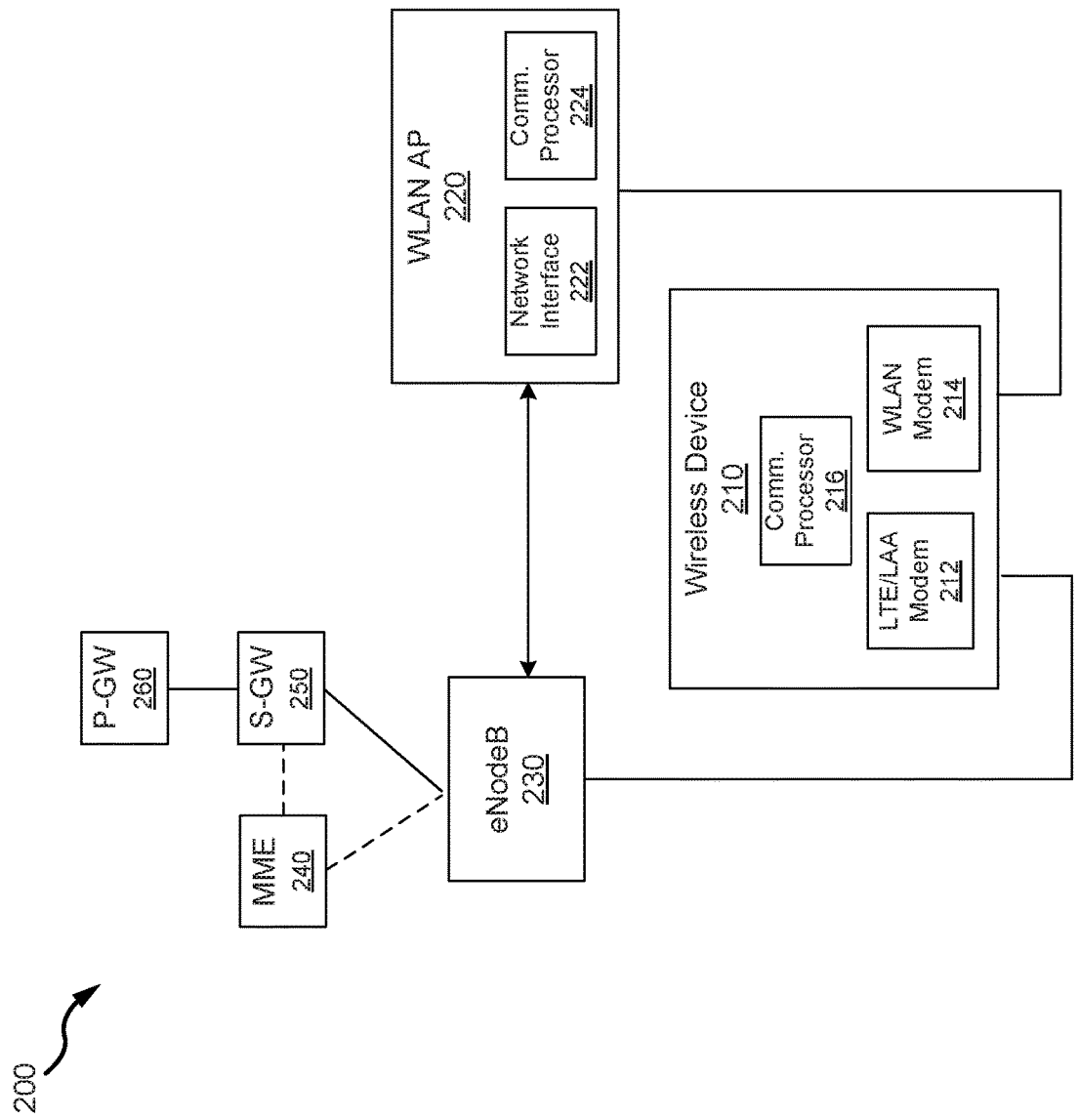
FIG. 2 illustrates an example of a communication system with wireless network selection capability in accordance with one or more implementations.

FIG. 2 illustrates an example of a communication system 200 with wireless network selection capability in accordance with one or more implementations. The communication system 200 includes, but is not limited to, a wireless device 210, a WLAN AP 220, an eNodeB 230, a mobility management entity (MME) 240, a serving gateway (S-GW) 250, and a packet data network gateway (P-GW) 260.

The wireless device 210 is an example implementation of the user device 110 of FIG. 1 and can be referred to as a terminal device, a user device, a user equipment (UE), or a station (STA). The wireless device 210 includes suitable logic, circuitry, interfaces, memory, and/or code that enables communications, e.g., with one or more base stations such as eNodeB 230 and/or one or more WLAN APs such as WLAN AP 220, via wireless interfaces and utilizing one or more radio transceivers. The wireless device 210 may also be operable to communicate wirelessly with one or more other user devices, one or more other base stations, and/or one or more other access points not shown in FIG. 2. In some implementations, the wireless device 210 includes, but is not limited to, a communication processor 216, an LTE/LAA modem 212, and a WLAN modem 214. The communication processor 216 can be a dedicated processor, a microcontroller, or a general processor of the wireless device 210 that is configured to perform specialized functionalities related to the subject technology. The LTE/LAA modem 212 includes suitable logic, circuitry, interfaces, memory, and/or code that enable LTE/LAA communications (e.g., over licensed spectra) with one or more base stations (e.g., eNodeB 230). The WLAN modem 214 includes suitable logic, circuitry, interfaces, memory, and/or code that enable WLAN communications with one or more WLAN APs (e.g., WLAN AP 220).

The WLAN AP 220 includes a network interface 222 and a communication processor 224. The network interface 222 includes suitable logic, circuitry, interfaces, memory, and/or code that enable WLAN communications with one or more base stations (e.g., eNodeB 230) or one or more terminal devices (e.g., wireless device 210). The communication processor 224 can be a dedicated processor, a microcontroller, or a general processor of the WLAN AP 220 that is configured to perform specialized functionalities related to the subject technology.

The S-GW 250 resides in the user plane where it forwards and routes packets to and from the eNodeB 230 and P-GW 260. The S-GW 250 also serves as the local mobility anchor for inter-eNodeB handover and mobility between 3GPP networks. The P-GW 260 is responsible for an important network function for the 4G mobile core network, known as the evolved packet core (EPC). The P-GW 260 can act as an interface between an LTE network and other packet data networks, such as the Internet or session-initiation protocol (SIP)-based IP multi-media subsystem (IMS) networks. The MME 240 is the main signaling node of the EPC and is responsible for initiating paging and authentication of the wireless device 210.

In one or more implementations, the subject technology facilitates LWA/LWIP support, whereby transmissions between a given base station (e.g., eNodeB 230) and a given wireless device 210 are aggregated over licensed and unlicensed spectra using LTE and WLAN (802.11) radio interfaces. The aggregation can be performed at the radio layer in a way that can take advantage of radio layer information such as signal quality metric.

Because cellular networks are designed to provide almost complete coverage over a wide geographical area, the wireless device 210 maintains, in most circumstances, almost continuous attachment (connection) to at least one cellular base station (e.g., 230). Handoff between these base stations, for example, as the user moves from one area to another, is managed by the cellular network based on signal quality measurements received from the terminal devices (e.g. the wireless device 210).

The LWA and LWIP features require WLAN access points (e.g., 220) to be deployed in the coverage area of certain base stations that support LWA/LWIP. Typically, WLAN APs operate at relatively low power (as required by their use of unlicensed spectrum) and thus do not provide contiguous coverage over extended coverage areas. Further, LWA/LWIP coverage is primarily of interest for deployment in certain areas where there are high capacity requirements (e.g. dense areas with many users where the aggregate demand for data traffic is high). Therefore, as terminal devices (e.g., the wireless device 210), move from one area to another, they will pass in and out of areas where LWA/LWIP service is possible.

Therefore, as a terminal devices (e.g. the wireless device 210) move into areas of LWA/LWIP coverage, the wireless device 210 may need to select a WLAN network which can support the LWA/LWIP features. It is understood that terminal devices may not always use WLAN networks for the purpose of LWA/LWIP, for example, terminal devices can use WLAN networks standalone (e.g., without aggregation or integration with a cellular network) in order to access, for example, home and enterprise networks or public hotspot.

In the subject system, a direct indication of LWA/LWIP support is provided in the beacon frames broadcast by a WLAN AP (e.g., 220) and probe response frames that may be unicast or broadcast by the WLAN AP 220. This indication allows the wireless device 210, during its regular WLAN scanning (either when actively searching for a new network, or background scanning for other APs to potentially transition to), to identify a WLAN AP such as the WLAN AP 220 that supports LWA and LWIP services. In some aspects, the indication makes use of a known roaming consortium element which is already defined in IEEE 802.11-2012 to be optionally broadcast in beacon frames and probe response frames. Within this element, a WLAN AP 220 that supports LWA or LWIP would set one of the "OI" (Organization Identifier) fields to a unique value which the cellular carrier has obtained from IEEE. If a cellular carrier supports both LWA and LWIP anywhere on their network, it would obtain two distinct OIs and transmit them to one or more WLAN APs according to which of the two features (LWA or LWIP) those WLAN APs support.

In one or more implementations, two OIs may be used, one global OI to represent LWA or LWIP (e.g., obtained from IEEE), and another OI to represent the carrier, which need not be specific to LWA/LWIP.

Thus, the subject system provides for the inclusion of one or more "OIs" (as described above) in a carrier policy such as an access network discovery and selection function (ANDSF) or another carrier policy, which is provisioned on the wireless device 210. This policy, in addition to its existing role of indicating to the wireless device 210, the conditions under which to try to use LWA/LWIP service, would additionally specify the unique OI that corresponds to that service.

Further in the subject system, the wireless device 210, during its regular WLAN scanning, either when actively searching for a new network, or background scanning for other WLAN APs to potentially transition to, can receive OIs in beacon and/or probe response frames from WLAN APs it has discovered (e.g., 220), and extract any OIs present. The wireless device 210 compares these OIs against the OIs in its carrier policy (e.g. ANDSF). If it finds a match, and the corresponding policy indicates that the device should try to connect to the LWAI/LWIP service if possible, then the wireless device 210 initiates a MAC address check process by reading the BSSID List in SIB, using the LTE/LAA modem 212. As a next step, the wireless device 210 compares the BSSID List with the BSSIDs from which it received the beacon or probe response frames containing the matching OI. If there is a match, then wireless device 210 associates with the BSSID, performs authentication steps as necessary, and begins setting up of the LWA/LWIP aggregation.

Thus, the wireless device 210 discovers LWA/LWIP enabled WLAN APs (e.g., 220) as part of its own regular WLAN scanning process, and does not need to perform additional scanning just because it is in the coverage area of a LWA/LWIP enabled base station 230 (even though it may not be in coverage area of a suitable WLAN AP). This reduces power consumption and unlicensed spectrum overhead. Furthermore, the process does not require use of the LTE/LAA modem 212 until the existence of a suitable LWA/LWIP WLAN AP, which is specified by the carrier policy, is already determined, and the process does not require additional signaling by the base station 230 to indicate support for LWA/LWIP service.

FIG. 3 illustrates an example of a method 300 of wireless network selection in accordance with one or more implementations. The method 300 starts with setting, by a processor circuit (e.g., 224 of FIG. 2) of an access point device (e.g., 220 of FIG. 2), at least one field of a frame to at least one value, the value indicating that a wireless carrier supports at least one of a cellular-Wi-Fi link aggregation protocol or a cellular-wireless local area network (WLAN) link aggregation protocol (310). Connection is made, by a network interface circuit (e.g., 222 of FIG. 2), to a network and the frame is sent to a wireless device (e.g., 210 of FIG. 2). The frame indicates that the access point device is capable of supporting at least one of the cellular-Wi-Fi link or the cellular-WLAN link aggregation protocol.

Figure 4:
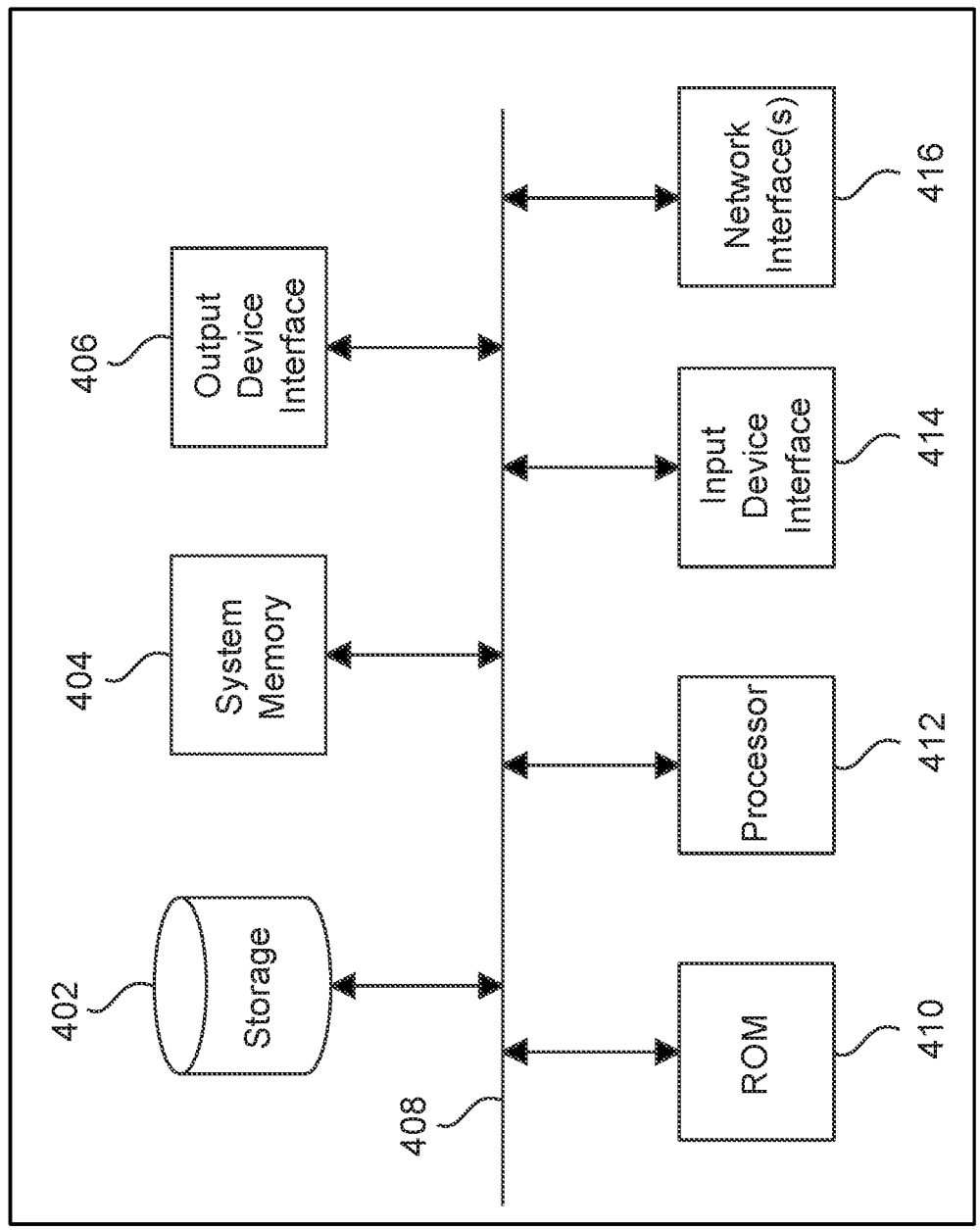
FIG. 4 conceptually illustrates an electronic system with which any implementations of the subject technology are implemented.

FIG. 4 conceptually illustrates an electronic system 400 with which one or more implementations of the subject technology may be implemented. The electronic system 400, for example, can be a network device, a media converter, a desktop computer, a laptop computer, a tablet computer, a server, a switch, a router, a base station, a receiver, a phone, or generally any electronic device that transmits signals over a network. Such an electronic system 400 includes various types of computer readable media and interfaces for various other types of computer readable media. In one or more implementations, the electronic system 400 can be, and/or can be a part of, one or more of the wireless device 210, base station 230, and/or WLAN AP 220. The electronic system 400 includes a bus 408, one or more processing unit(s) 412, a system memory 404, a read-only memory (ROM) 410, a permanent storage device 402, an input device interface 414, an output device interface 406, and a network interface 416, or subsets and variations thereof.

The bus 408 collectively represents all system, peripheral, and chipset buses that communicatively connect the numerous internal devices of the electronic system 400. In one or more implementations, the bus 408 communicatively connects the one or more processing unit(s) 412 with the ROM 410, the system memory 404, and the permanent storage device 402. From these various memory units, the one or more processing unit(s) 412 retrieves instructions to execute and data to process in order to execute the processes of the subject disclosure. The one or more processing unit(s) 412 can be a single processor or a multi-core processor in different implementations.

The ROM 410 stores static data and instructions that are needed by the one or more processing unit(s) 412 and other modules of the electronic system. The permanent storage device 402, on the other hand, is a read-and-write memory device. The permanent storage device 402 is a non-volatile memory unit that stores instructions and data even when the electronic system 400 is off. One or more implementations of the subject disclosure use a mass storage device (such as a magnetic or optical disk and its corresponding disk drive) as the permanent storage device 402.

Other implementations use a removable storage device (such as a floppy disk, flash drive, and its corresponding disk drive) as the permanent storage device 402. Like the permanent storage device 402, the system memory 404 is a read-and-write memory device. However, unlike the permanent storage device 402, the system memory 404 is a volatile read-and-write memory, such as random access memory. System memory 404 stores any of the instructions and data that the one or more processing unit(s) 412 needs at runtime. In one or more implementations, the processes of the subject disclosure are stored in the system memory 404, the permanent storage device 402, and/or the ROM 410. From these various memory units, the one or more processing unit(s) 412 retrieves instructions to execute and data to process in order to execute the processes of one or more implementations. In one or more implementations, the one or more processing unit(s) 412 can perform the functionalities of the communication processors 216 and 224 of FIG. 2.

The bus 408 also connects to the input device interface 414 and the output device interface 406. The input device interface 414 enables a user to communicate information and select commands to the electronic system. Input devices used with the input device interface 414 include, for example, alphanumeric keyboards and pointing devices (also called "cursor control devices"). The output device interface 406 enables, for example, the display of images generated by the electronic system 400. Output devices used with the output device interface 406 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 4, the bus 408 also couples the electronic system 400 to one or more networks (not shown) through one or more network interfaces 416. In this manner, the computer can be a part of one or more network of computers, such as a peer-to-peer network, a local area network ("LAN"), a wide area network ("WAN"), or an Intranet, or a network of networks, such as the Internet. Any or all components of the electronic system 400 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, eTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An access point device, comprising:
   a network interface circuit configured to receive a value from a wireless carrier; and
   at least one processor circuit configured to:
   set at least one field of a frame to the value received from the wireless carrier, the value indicating that the wireless carrier supports at least one of a cellular-Wi-Fi link aggregation protocol or a cellular-wireless local area network (WLAN) link aggregation protocol,
   wherein the at least one field comprises one or more organization identifier (OI) fields including a first OI field, wherein the first OI field represents a long-term evolution (LTE)-Wi-Fi link aggregation (LWA), and wherein the network interface circuit is further configured to connect to a network and to send the frame to a wireless device to advertise that the wireless device has an option of communicating with the access point device based on the at least one of the cellular-Wi-Fi link aggregation protocol or the cellular-WLAN link aggregation protocol.

2. The access point device of claim 1, wherein the cellular-Wi-Fi link aggregation protocol comprises an LWA protocol.

3. The access point device of claim 1, wherein the one or more OI fields further comprises a second OI field, and wherein the second OI field represents the wireless carrier.

4. The access point device of claim 3, wherein the frame comprises one of a beacon frame or a probe response frame.

5. The access point device of claim 4, wherein the network interface circuit is configured to broadcast the frame.

6. The access point device of claim 5, wherein the network comprises an IP network, and wherein the access point device comprises a WLAN access point (AP).

7. The access point device of claim 1, wherein, the cellular-WLAN link aggregation protocol comprises an LTE WLAN radio level with integration with IPsec Tunnel (LWIP) protocol.

8. The access point device of claim 1, wherein the value is received from the wireless carrier to which the wireless device subscribes.

9. A method comprising:
   receiving, by a network interface circuit, a value from a wireless carrier;
   setting, by a processor circuit of an access point device, at least one field of a frame to the value, the value indicating that a wireless carrier supports at least one of a cellular-Wi-Fi link aggregation protocol or a cellular-wireless local area network (WLAN) link aggregation protocol; and
   connecting, by the network interface circuit, to a network and sending the frame to a wireless device, the frame indicating that the wireless device has the option of communicating with the access point device based on at least one of the cellular-Wi-Fi link or the cellular-WLAN link aggregation protocol,
   wherein the at least one field comprises one or more organization identifier (OI) fields including a first OI field that represents a long-term evolution (LTE)-Wi-Fi link aggregation (LWA).

10. The method of claim 9, wherein the cellular-Wi-Fi link aggregation protocol comprises an LWA protocol.

11. The method of claim 9, wherein the one or more OI fields further comprises a second OI field, wherein the second OI field represents the wireless carrier, and wherein the frame comprises one of a beacon frame or a probe response frame.

12. The method of claim 9, wherein the cellular-WLAN link aggregation protocol comprises an LTE WLAN radio level with, integration with IPsec Tunnel (LWIP) protocol.

13. The method of claim 9, wherein the value is received from the wireless carrier to which the wireless device subscribes.

* * * * *